United States Patent
Lurie et al.

(10) Patent No.: US 8,018,965 B2
(45) Date of Patent: Sep. 13, 2011

(54) CONTENTION SLOTS IN A SHARED ROBUST SCHEME

(75) Inventors: Aharona Lurie, Or Yehuda (IL); Ronald Bruce Sterenson, Ra'anana (IL)

(73) Assignee: CopperGate Communications Ltd., Tel Aviv (IL)

( * ) Notice: Subject to any disclaimer, the term of this patent is extended or adjusted under 35 U.S.C. 154(b) by 258 days.

(21) Appl. No.: 12/261,188

(22) Filed: Oct. 30, 2008

(65) Prior Publication Data
US 2009/0109992 A1    Apr. 30, 2009

Related U.S. Application Data

(60) Provisional application No. 60/983,615, filed on Oct. 30, 2007, provisional application No. 60/989,658, filed on Nov. 21, 2007.

(51) Int. Cl.
*H04B 7/212* (2006.01)
(52) U.S. Cl. .................. 370/443; 370/461
(58) Field of Classification Search .......... 370/248, 370/252, 286, 290–292, 338, 354, 389, 431, 370/439, 443, 445, 458, 462, 516, 235, 328; 709/233; 375/354
See application file for complete search history.

(56) References Cited

U.S. PATENT DOCUMENTS

| | | | | |
|---|---|---|---|---|
| 3,749,842 A | * | 7/1973 | Poretti | 370/301 |
| 5,491,531 A | * | 2/1996 | Adams et al. | 375/354 |
| 5,841,777 A | * | 11/1998 | Cohen | 370/443 |
| 6,185,195 B1 | * | 2/2001 | Leung | 370/286 |
| 6,310,886 B1 | * | 10/2001 | Barton | 370/462 |
| 6,404,756 B1 | * | 6/2002 | Whitehill et al. | 370/338 |
| 6,879,579 B1 | | 4/2005 | Myles et al. | |
| 7,408,949 B2 | | 8/2008 | Baum | |
| 2003/0086373 A1 | * | 5/2003 | Kronz | 370/235 |
| 2004/0141517 A1 | * | 7/2004 | Balasubramanian et al. | 370/462 |
| 2004/0162912 A1 | * | 8/2004 | Taraci | 709/233 |
| 2005/0047379 A1 | * | 3/2005 | Boyden et al. | 370/338 |
| 2006/0023632 A1 | * | 2/2006 | Ozer et al. | 370/248 |
| 2006/0165078 A1 | * | 7/2006 | Gopinath et al. | 370/389 |
| 2007/0064720 A1 | | 3/2007 | Sterenson | |
| 2007/0165666 A1 | | 7/2007 | Lifshitz et al. | |

* cited by examiner

*Primary Examiner* — Andrew Lai
(74) *Attorney, Agent, or Firm* — AlphaPatent Associates Ltd.; Daniel J. Swirsky

(57) ABSTRACT

A method includes receiving a schedule of transmission start slots on a network node, the slots representing reserved and/or nonreserved opportunities for initiating data transmission by at least one network device in a network, the reserved opportunities associated with specific network devices, and the non-reserved opportunities available for non-reserved use by any network device on the network, and adjusting the schedule in accordance with successful transmissions by other network nodes. Another method includes generating a schedule of transmission start slots on a master node, where the slots represent reserved and/or nonreserved transmission initiation opportunities for the initiation of data transmission by at least one of a plurality of network devices in a network, the reserved opportunities being associated with specific network nodes, and the nonreserved opportunities being available for nonreserved use by any the network devices on the network, and distributing the schedule to the network devices.

9 Claims, 4 Drawing Sheets

CONTENTION SLOTS IN A SHARED ROBUST SCHEME

CROSS-REFERENCE TO RELATED APPLICATIONS

This application claims benefit from U.S. Provisional Patent Application No. 60/983,615, filed Oct. 30, 2007, and 60/989,658, filed Nov. 21, 2007 which are hereby incorporated in their entirety by reference.

FIELD OF THE INVENTION

The present invention relates to data networks generally and to media access allocation in data networks in particular.

BACKGROUND OF THE INVENTION

There are many different types of data networks, of which Ethernet is perhaps the best known. Some data networks have resource reservation schemes. One such network is Home-PNA (Home Phoneline Network Alliance) v3.1 which is designed to work over existing telephone lines to create a home/small office network. U.S. patent application Ser. No. 11/000,524, filed Dec. 1, 2004 and assigned to the common assignee of the present invention, describes generally how to extend the HomePNA v3.1 standard to operate over a hybrid network of telephone and coax lines.

HPNA v3.1 and other such resource reservation networks have a scheduler, described hereinbelow, to guarantee media resources to network devices, to prevent collision between multiple network devices using the same line and to ensure quality of service. In coax networks, preventive collision detection limits the dynamic range of the network devices, which may impose physical limitations on the size of the network, so it is preferable to use collision avoidance methods for media access in coax networks.

Such a collision avoidance method is disclosed in U.S. patent application Ser. No. 11/218,708 entitled 'Collision Avoidance Media Access Method for Shared Networks', filed Sep. 6, 2005 and assigned to the common assignee of the present invention. This application is incorporated herein by reference. The collision avoidance/ carrier sensing media access (CA/CSMA) method disclosed in the application employs a media access plan (MAP) having sub-burst slots. Each sub-burst slot has a shorter duration than a minimal transmission burst duration (e.g., 8-32 μsecs), is associated with a particular one or group of network participants, and represents a reserved opportunity for the initiation of a data transmission by its associated network participants.

The MAP for a transmission cycle dictates a schedule of sub-burst slots, wherein numbered sub-burst slots are scheduled in a particular order. FIG. 1A, reference to which is now made, shows an exemplary sub-burst slot schedule 10, in which five sub-burst slots numbered 0 through 4 are scheduled in sequential order. Sub-burst slot schedule 10 may also be seen as a grid of transmission opportunity start times. The start time STN for each sub-burst slot N is the moment at which the network participant associated with sub-burst slot N may begin to transmit.

In the initial grid of transmission opportunity start times (before any transmissions occur), the start time of each sub-burst slot N, $ST_N$, occurs after the sum of the durations of the sub-burst slots preceding sub-burst slot N. For example, as shown in FIG. 1A, the initial start times $STi_0$, $STi_1$, $STi_2$, $STi_3$, and $STi_4$ of sub-burst slots 0-4 respectively, occur at (t=0), (t=$d_0$), (t=$d_0$+$d_1$), (t=$d_0$+$d_1$+$d_2$), and (t=$d_0$+$d_1$+$d_2$+$d_3$) respectively, where $d_0$, $d_1$, $d_2$, and $d_3$ are the durations of sub-burst slots 0-4 respectively.

The principal advantage of sub-burst slots over regular sized time slots is that when a network participant does not use its transmission opportunity, minimal time is wasted before the opportunity to transmit is passed to the next network participant in the queue. On the other hand, when a network participant opts to transmit when its turn arrives, the allowable transmission duration is not limited by the short duration of the sub-burst slot. Rather, the sub-burst slot expands to encompass the required transmission burst duration. Accordingly, the start times of the succeeding sub-burst slots are delayed by an amount of time equal to the portion of the transmission duration which exceeds the original sub-burst slot duration. In effect, the entire grid of transmission opportunity start times shifts by this amount.

For example, as shown in FIG. 1B, reference to which is now made, timing diagram 15 for an exemplary transmission cycle operating in accordance with sub-burst slot schedule 10 shows how a transmission during sub-burst slot '1' alters the initial grid of transmission opportunity start times for the sub-burst slots following sub-burst slot '1'. As shown in FIG. 1B, start times $STb_2$, $STb_3$ and $STb_4$ are incremented by x, the portion of the transmission transmitted during sub-burst slot '1' which exceeds the original sub-burst slot duration $d_1$.

In a network employing the CA/CSMA method described hereinabove, all of the participating network nodes receive the MAP and extract from it their relative transmission opportunities. They then employ physical carrier sensing (PCS) to monitor transmissions occurring over the network so that, subsequent to each transmission, they can synchronize to an updated transmission opportunities (TXOPs) schedule accounting for transmission-induced shifts in the sub-burst slot start time grid.

SUMMARY OF THE PRESENT INVENTION

An object of the present invention is to improve upon the prior art.

There is therefore provided, in accordance with a preferred embodiment of the present invention, a method including receiving a schedule of transmission start slots on a network node, where the transmission start slots represent at least one of reserved and non reserved transmission initiation opportunities for the initiation of data transmission by at least one of a plurality of network devices in a network, the reserved opportunities being associated with specific network devices, and the non reserved opportunities being available for non reserved use by any network device on the network, and adjusting the schedule in accordance with successful transmissions by other network nodes.

Further, in accordance with a preferred embodiment of the present invention, the method also includes attempting to transmit in accordance with a transmission start slot representing a non reserved transmission opportunity.

Still further, in accordance with a preferred embodiment of the present invention,the method also includes detecting at least an unsuccessful attempt to transmit, backing off in accordance with a random number of the non scheduled transmission initiation opportunities as per the schedule, reattempting to transmit in accordance with a transmission start slot representing a subsequent non scheduled transmission opportunity as per the schedule.

Additionally, in accordance with a preferred embodiment of the present invention, the detecting includes transmitting a request to transmit (RTS), and waiting a predefined period of time to receive a "clear to send" (CTS) in reply to the RTS.

Moreover, in accordance with a preferred embodiment of the present invention, the detecting includes using physical collision detection based on echo cancellation.

Further, in accordance with a preferred embodiment of the present invention, the adjusting includes detecting transmissions by other the network nodes in accordance with the schedule, and delaying the transmission start slots in accordance with a transmission length of the detected transmissions.

Still further, in accordance with a preferred embodiment of the present invention, the network uses a powerline medium.

Additionally, in accordance with a preferred embodiment of the present invention, the method also includes transmitting an in use signal, expanding the transmission start slot to a standard sized backoff window, backing off within the backoff window in accordance with a random duration, transmitting data, and resolving any ensuing detected collisions within the backoff window as necessary.

There is also provided, in accordance with a preferred embodiment of the present invention, a method including generating a schedule of transmission start slots on a master node, where the transmission start slots represent at least one of reserved and non reserved transmission initiation opportunities for the initiation of data transmission by at least one of a plurality of network devices in a network, the reserved opportunities being associated with specific network nodes, and the non reserved opportunities being available for non reserved use by any network device on the network, and distributing the schedule to the network devices.

Further, in accordance with a preferred embodiment of the present invention, the method also includes tracking transmissions by the network devices in accordance with the schedule, and adjusting the schedule by rescheduling the transmission start slots in accordance with at least a length of the tracked transmissions.

Still further, in accordance with a preferred embodiment of the present invention, the tracking also includes detecting non reserved transmissions from among the tracked transmissions, and adding scheduled transmission start opportunities for the network devices associated with the detected non reserved transmissions to a new the schedule to be distributed to the network devices.

Additionally, in accordance with a preferred embodiment of the present invention, the tracking also includes detecting a lack of reserved transmissions from among the tracked transmissions, and removing scheduled transmission start opportunities for the network nodes associated with the lack of scheduled transmissions from a new schedule to be distributed to the network devices.

Moreover, in accordance with a preferred embodiment of the present invention, the network uses a powerline medium.

There is also provided, in accordance with a preferred embodiment of the present invention, a master node including a scheduler to generate a schedule of transmission start slots, where the transmission start slots represent at least one of reserved and non reserved transmission initiation opportunities for the initiation of data transmission by at least one of a plurality of network devices in a network, the reserved opportunities being associated with specific the network devices, and the non reserved opportunities being available for non reserved use by any the network devices on the network, and means to distribute the schedule to the network devices.

Further, in accordance with a preferred embodiment of the present invention, the master node also includes means to track transmissions by the network devices in accordance with the schedule, and a schedule adjuster to adjust the schedule by rescheduling the transmission start slots in accordance with at least a length of the tracked transmissions.

Still further, in accordance with a preferred embodiment of the present invention, the schedule adjuster also includes means to add the scheduled transmission start opportunities for the network nodes associated with non scheduled transmissions to a new schedule to be distributed to the network devices.

Additionally, in accordance with a preferred embodiment of the present invention, the schedule adjuster also includes means to remove the scheduled transmission start opportunities from a new schedule to be distributed to the network nodes, where the transmission start opportunities are associated with the network nodes for which there are no associated scheduled transmissions detected.

Moreover, in accordance with a preferred embodiment of the present invention, the network uses a powerline medium.

There is also provided, in accordance with a preferred embodiment of the present invention, a network node including means to receive a schedule of transmission start slots on a network node, where the transmission start slots represent at least one of reserved and non reserved transmission initiation opportunities for the initiation of data transmission by at least one of a plurality of network devices in a network, the scheduled opportunities being associated with specific network nodes, and the non scheduled opportunities being available for non reserved use by any network device on the network, and a schedule adjuster to adjust the schedule in accordance with successful transmissions by other network nodes.

Further, in accordance with a preferred embodiment of the present invention, the node also includes means to transmit in accordance with a transmission start slot representing a the non reserved transmission opportunity.

Still further, in accordance with a preferred embodiment of the present invention, the node also includes means to detect at least an unsuccessful attempt to transmit, and a back off mechanism to reattempt to transmit in accordance with a random "backing off" in accordance with the non reserved transmission initiation opportunities as per the schedule.

Additionally, in accordance with a preferred embodiment of the present invention, the means to detect includes means to transmit a RTS, and means to process an expected CTS to be received in reply to the RTS.

Moreover, in accordance with a preferred embodiment of the present invention, the means to detect includes a physical collision detector to use echo cancellation to detect collisions.

Further, in accordance with a preferred embodiment of the present invention, the adjustor includes means to detecting transmissions by other the network nodes in accordance with the schedule, and a rescheduler to delay the transmission start slots in accordance with a transmission length of the detected transmissions.

Still further, in accordance with a preferred embodiment of the present invention, the network uses a powerline medium.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

A network employing the CA/CSMA method as described in the Background may incur an inherent overhead and loss in network throughput whenever a sub-burst slot is not used by the device to which it is assigned. It will be appreciated that as the number of unused sub-burst slots increases, so does the amount of wasted media access time resulting in a decrease in effective network throughput.

Network throughput may be improved by assigning sub-burst slots exclusively to devices on a contention free basis only if and when such devices are actively transmitting. Such a method may improve network throughput by preventing the "waste" of unused sub-burst slots. Wasted media access time may be minimized, since unused sub-burst slots may largely be avoided. Once a device ceases to transmit, its associated sub-burst slots may be reassigned to another actively transmitting device. However, implementing such a method may also prevent previously inactive devices from transmitting. If sub-burst slots may be assigned solely to actively transmitting devices, then new or currently inactive devices may not have the opportunity to register for assignment of sub-burst slots.

Applicants have realized that by adding a number of contention based slots to a TXOP comprising contention free sub bursts slots, network throughput may still be improved while providing for the registration of new or inactive devices. The media access rules for the added contention based slots may use a contention-based media access method typically based on collision detection/inference and the use of a backoff mechanism. An example of such a method may be the IEEE 802.11 Distributed Coordination Function (DCF). The backoff mechanism may run on top of the underlying sub-burst slot mechanism and may effectively select a random contention-based sub-burst slot from among those available in which to retry a transmission. Collision detection may be performed using physical collision detection (e.g. based on echo cancellation), or logical collision detection based on acknowledgement, such as RTS-CTS (Request To Send-Cleared To Send) and ACK mechanisms.

Figure 1A:
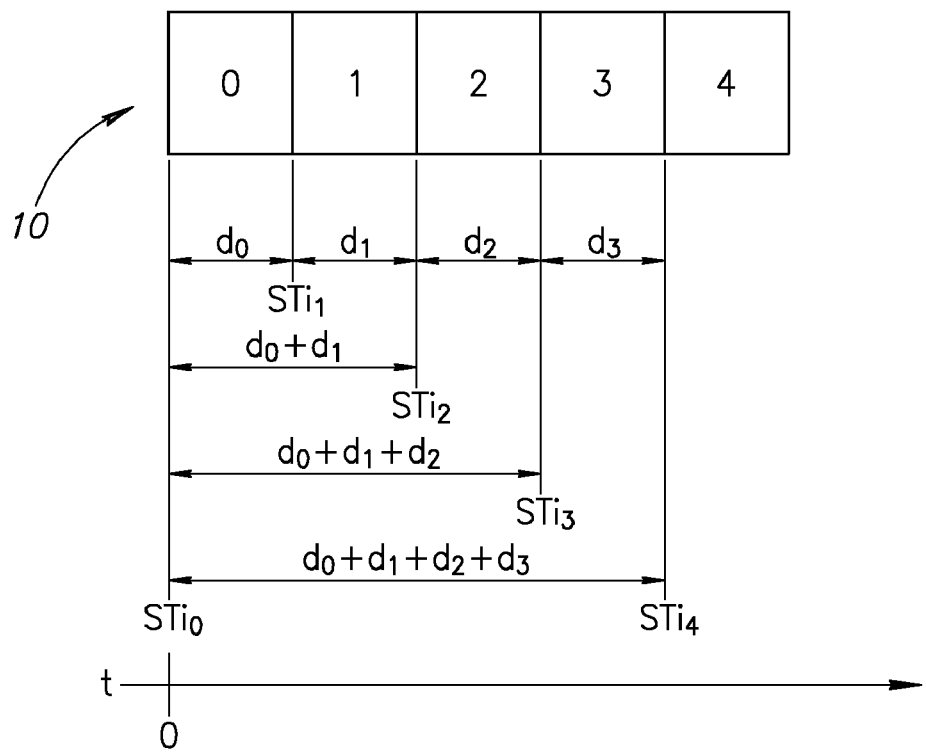
FIG. 1A is an illustration of a schedule of sub-burst slots according to an exemplary media access plan (MAP) operative in a network employing a collision avoidance/ carrier sensing media access (CA/CSMA) method.
Figure 1B:
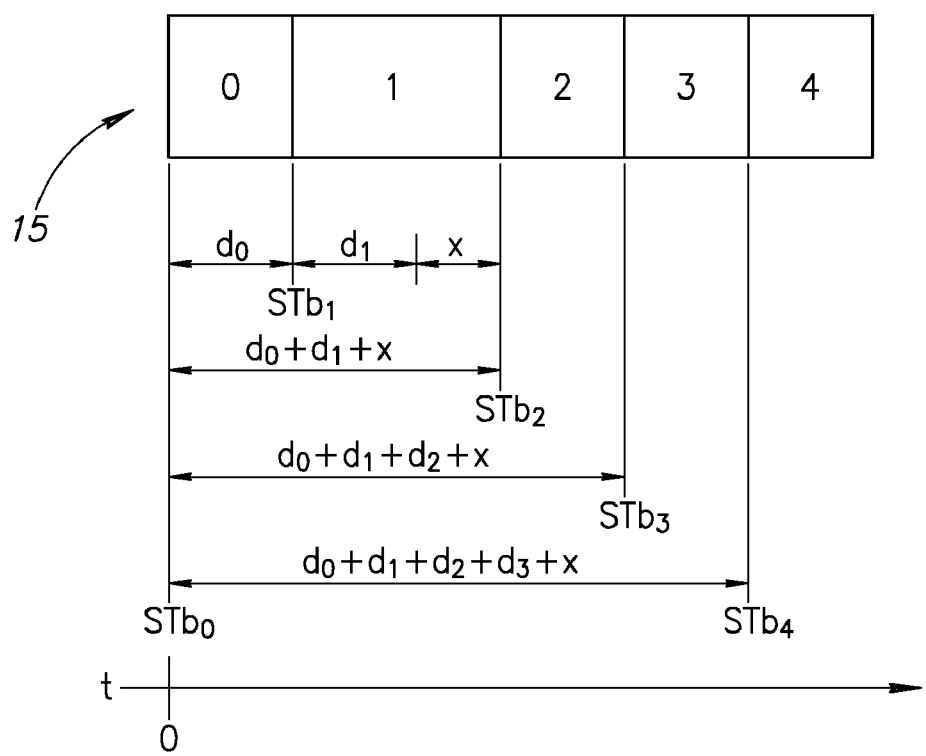
FIG. 1B is a timing diagram illustration for an exemplary transmission cycle for the schedule of FIG. 1.
Figure 2:
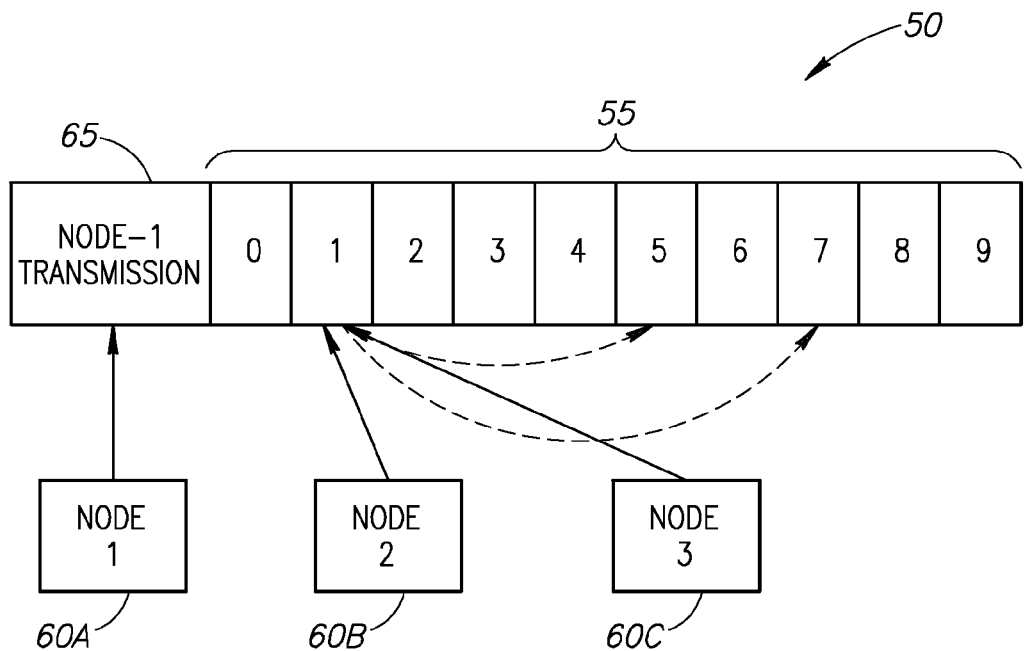
FIG. 2 is an illustration of an exemplary contention based TXOP schedule.

Reference is now made to FIG. 2. FIG. 2 shows an exemplary contention based TXOP schedule 50 with a backoff mechanism such as DCF. Nodes 60 may compete for transmission opportunities 55 which may be "raffled off" by a media access controller (not shown). For example, node 60A may transmit transmission 65. Once transmission 65 may be completed, other nodes, such as nodes 60B and 60C may compete for a transmission opportunity 55. If a node 60 is the only one to attempt to transmit according to a given opportunity 55, then it may continue to transmit until its transmission is completed. In the example of FIG. 2 it may be assumed that in such manner Node 60A "received permission" to transmit transmission 65.

However, if two nodes both attempt to transmit as per the same opportunity 55, the resulting collision may preclude either one of them from completing a transmission 65. For example, as shown in FIG. 2, both node 60B and node 60C may have attempted to transmit as per the transmission opportunity 50 labeled "1". The resulting collision may be resolved by a backoff mechanism such as DCF. Each of the involved nodes may "back off" in accordance with a randomized function and attempt to transmit as per a different opportunity 55. For example, as shown in FIG. 2, node 60B may reattempt to transmit as per the transmission opportunity labeled "7" and node 60C may attempt to do so as per the opportunity 55 labeled "5". In such manner, the collision between nodes 60B and 60C may be resolved.

It will be appreciated that such backing off may continue for as many additional attempts as needed. Furthermore, other nodes 60 may also be attempting to transmit at the same time. The time required to resolve the collision may be a function of the overall traffic on the network medium.

Figure 3A:
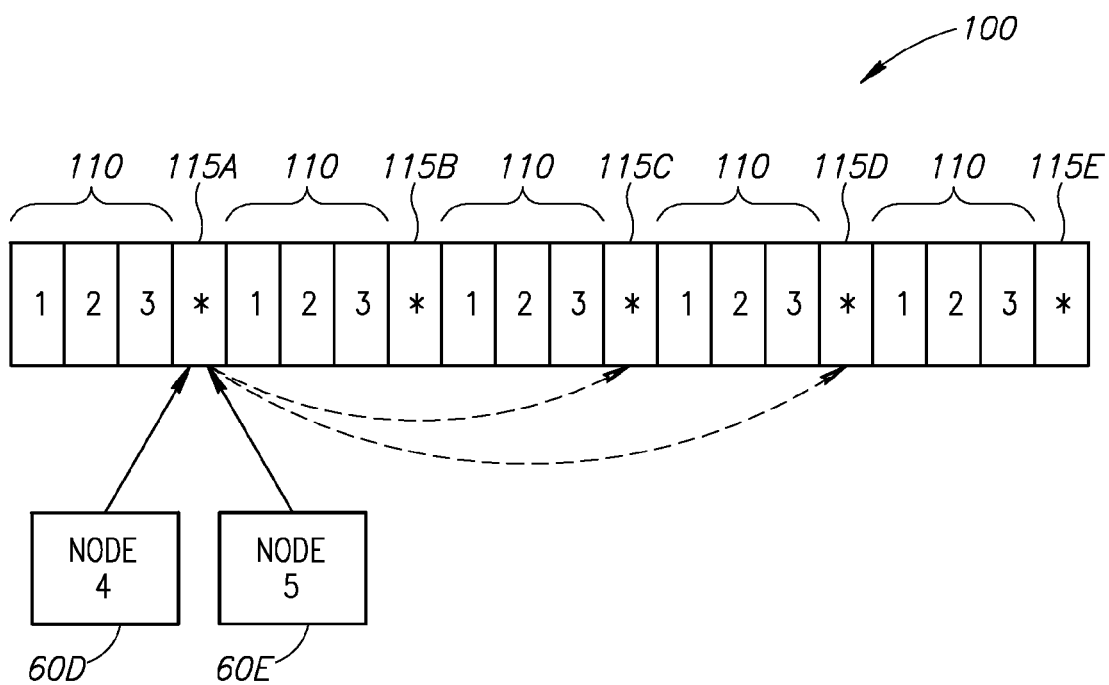
FIG. 3A is an illustration of a novel TXOP schedule combining an overall contention free sub burst slots model with additional contention based sub burst slots, constructed and operative in accordance with a preferred embodiment of the present invention.

FIG. 3A, to which reference is now made, shows a novel TXOP schedule 100 combining an overall contention free sub burst slots model with additional contention based sub burst slots, constructed and operative in accordance with a preferred embodiment of the present invention. By adding contention based slots to a prior art contention free TXOP schedule, the present invention may increase network throughput while enabling registration of new or previously inactive devices wishing to begin transmission. It will be appreciated that TXOP schedule 100 may be generated and updated as necessary by a scheduler on a master node on the network as per the prior art.

TXOP schedule 100 may comprise allocated sub burst slots 110 and "wildcard" sub burst slots 115. Allocated sub burst slots 110 may be contention free in nature; each slot 110 may be reserved for transmission by a single node 60. Furthermore, in accordance with a preferred embodiment of the present invention, allocated sub burst slots 110 may only be allocated to nodes 60 that may have already begun transmitting. For example, as shown in FIG. 3A, there may be three such nodes 60 as represented by allocated slots 110 labeled 1, 2 and 3. Each of the scheduled allocated slots 110 may be reserved for one of these three nodes 60. In contrast, wildcard slots 115 may be available for transmissions by nodes 60 on a contention basis, where such nodes 60 may not have associated allocated slots 110. Accordingly, it will be appreciated that schedule 100 may comprise a mix of both reserved transmission start slots (allocated slots 110) and non reserved transmission start slots (wildcard slots 115).

For example, nodes 60D and 60E may be currently inactive or may not have previously transmitted. Accordingly they may not have associated allocated slots 110. Accordingly, they may attempt to transmit as per a wildcard slot 115. If only one node 60 may attempt to transmit according to a wildcard slot 115, then it may continue to transmit until its transmission is completed as in the prior art.

However, it is possible that more than one node 60 may attempt to transmit as per a given slot 115. For example, if node 60D and node 60E may both attempt to transmit as per wildcard slot 115A, then the resulting collision may prevent either one from continuing the transmission.

Nodes 60D and 60E may each comprise means to calculate a random backoff from wildcard slot 115A. For example, as shown in FIG. 3A, node 60D may reattempt to transmit as per wildcard slot 115D; whereas node 60E may reattempt to retransmit as per wildcard slot 115C. It will be appreciated that as in the prior art, such backing off may persist until the collision is resolved.

When a node 60 is able to successfully transmit in a wildcard slot 115, it may provide sufficient identifying information to a master node (using signaling protocols or other methods, e.g. information in the frame control) that may enable the master to assign a unique allocated slot 110 to the device.

Figure 3B:
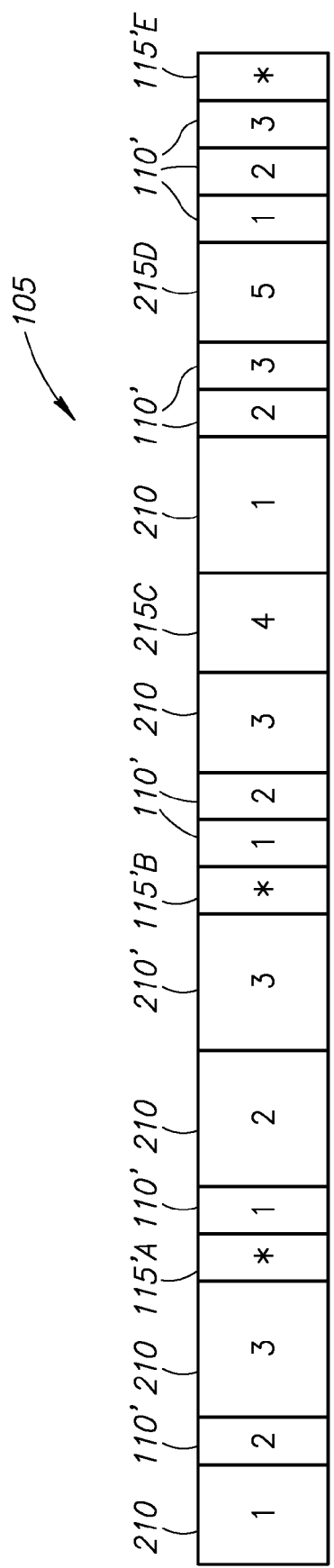
FIG. 3B is an illustration of a timing diagram for an exemplary transmission cycle operating in accordance with the TXOP schedule of FIG. 3A.

FIG. 3B, to which reference is now made, illustrates a timing diagram 105 for an exemplary transmission cycle operating in accordance with TXOP schedule 100. Timing diagram 105 may comprise unused sub burst slots 110', unused wildcard slots 115', scheduled transmission sessions 210 and wildcard transmission sessions 215. Unused sub burst slots 110' and scheduled transmission sessions 210 may together correlate to allocated sub burst slots 110 as represented in FIG. 3A, and may therefore be associated with nodes 60A, 60B and 60C. Similarly, unused wildcard slots 115' and wildcard transmission sessions 215 may together correlate to wildcard slots 115 as represented in FIG. 3A, and may therefore be associated with nodes 60D and 60E.

Scheduled transmission sessions 210 may represent transmissions by nodes 60A, 60B and 60C taking advantage of allocated sub burst slots 110. It will be appreciated that each transmission session 210 may have impacted on the original schedule 100 in FIG. 3A by delaying the start of subsequent sub burst slots 110 and wildcard slots 115. However, other than a delayed start due to a transmission session 210, the remaining portion of schedule 100 after each such transmission session 210 may have remained generally the same.

Similarly, wildcard transmission sessions 215 may represent transmissions by nodes 60D and 60E taking advantage of wildcard slots 115. As discussed in the context of FIG. 3A, nodes 60D and 60E may both have attempted to transmit during unused wildcard slot 115'A. After detecting a collision, both nodes 60 may have "backed off" from wildcard slot 115A; neither node 60D, nor node 60E may have continued to attempt to transmit during wildcard slot 115A. Instead each may have attempted to transmit in accordance with a random subsequent wildcard slot 115. As shown in FIG. 3B, in accordance with the exemplary embodiment of FIG. 3A, node 60D may have transmitted during wildcard transmission slot 115D, and node 60E may have transmitted during wildcard transmission slot 115C. These transmissions may be respectively represented in FIG. 3B as wildcard transmission sessions 215D and 215C.

It will be appreciated that wildcard transmission sessions 215 may have impacted on the original schedule 100 in a similar manner as scheduled transmission sessions 210. Each wildcard transmission session 215 may have delayed the start of subsequent sub burst slots 110 and wildcard slots 115. However, other than a delayed start due to a transmission session 215, the remaining portion of schedule 100 after each such transmission session 215 may have remained generally the same.

Figure 4:
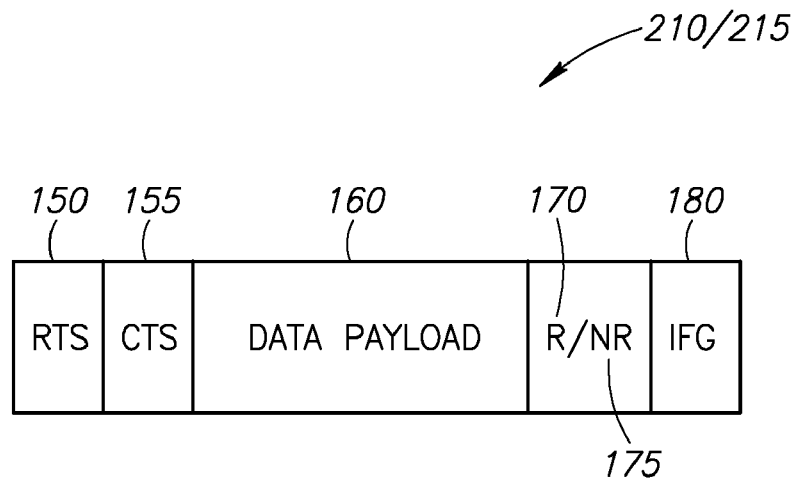
FIG. 4 is an illustration of an exemplary transmission session transmitted in accordance with the TXOP schedule of FIG. 3A.

It will be appreciated that a transmission session 210 or 215 may comprise more than a single one-way transmission of a frame control and data payload. For example, as shown in FIG. 4, to which reference is now made, in addition to a data payload 160, a transmission session 210 or 215 may also comprise an RTS 150 from a transmitting node 60 and an answering CTS 155 from a node 60 that may receive the transmission. Similarly, a transmission session 210 or 215 may also comprise a "received transmission" 170 or "not received transmission 175" response from a receiving node 60. U.S. Patent Application #(C-25-US), assigned to the common assignees of the present application and hereby incorporated in its entirety by reference, may disclose a method for using such "received" and "not received" responses to detect collisions and/or otherwise unsuccessful transmission sessions. A typical session 210 or 215 may also comprise an inter-frame gap (IFG) 180 which may delineate the end of a session 210/215.

In accordance with a preferred embodiment of the present invention, it may be possible to implement different media access schemes within different slot times in a dynamic manner over the same network medium. For example, a TXOP schedule 100 may comprise only allocated slots 110, thus implementing the prior art media access method used by G.9954 (HPNA 3.1) within a shared TXOP. Alternatively, only wildcard slots 115 may be defined, thus implementing a pure backoff based media access method such as IEEE 802.11 DCF. The present invention may also therefore include any hybrid media access scheme of contention-free and contention-based sub-burst slots.

Figure 5:
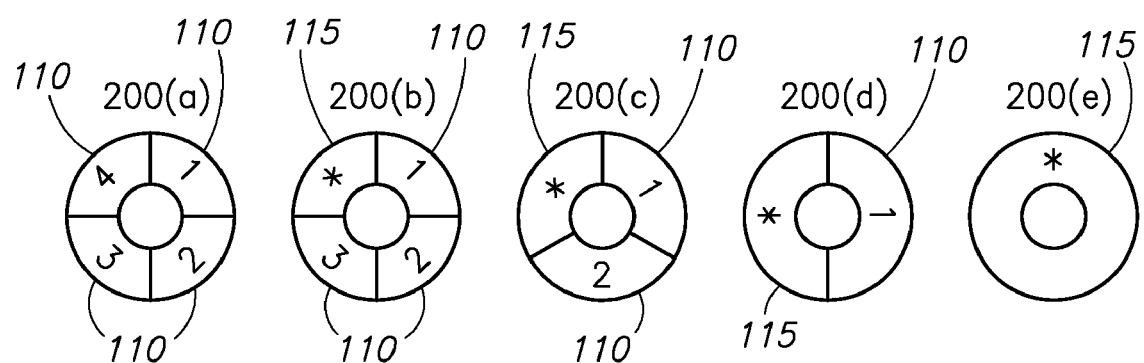
FIG. 5 is an illustration of an exemplary series of sub-burst slot assignments as they may appear in successive MAPs issued in accordance with a preferred embodiment of the present invention.

Reference is now to FIG. 5 which represents an exemplary series of sub-burst slot assignments as they may appear in successive MAPs 200. In MAP 200A all of the relevant nodes (e.g. nodes 1-4) may be transmitting and may have been assigned allocated sub-burst slots 110. In MAP 200B node 4 may have stopped transmitting and its sub-burst slot may have been reassigned as a wildcard slot 115. In MAP 200C node 3 may also have stopped transmitting and its sub-burst slot may also have been reassigned among the remaining transmitters. The trend may continue until finally in MAP 200E only a contention-based wildcard sub-burst slot 115 may remain. Accordingly, MAP 200E may represent a media access scheme that is pure contention-based media access with backoff.

In accordance with a preferred embodiment of the present invention, a "backoff window" maybe defined as a target area of schedule 100 in which nodes 60 may reattempt to transmit. As determined by a randomizing function, a node 60 may reattempt to transmit as per any wildcard slot in the backoff window. For example, in FIG. 3 a backoff window may be defined as starting with wildcard slot 115 B and ending with wildcard slot 115E.

It will be appreciated that there may be a correlation between the size of the backoff window and the likelihood that subsequent retransmissions may or may not succeed without recurring collisions. The larger the window, the more likely that a subsequent retransmission may succeed without collision. However, it will be similarly appreciated, that the larger the window, the longer it may take for a retransmission to actually complete. Applicants have therefore realized that it maybe beneficial to adjust the size of the backoff window in accordance with network traffic.

In accordance with an alternative preferred embodiment of the present invention, multiple backoff windows may be defined as per 802.11. For example, a relatively small backoff window may be defined for a first retransmission attempt. If the first retransmission attempt may fail, the original backoff window may be progressively replaced with increasingly larger backoff windows until a retransmission may be successful. In such manner, a node 60 may attempt to complete its transmission as quickly as possible in accordance with the prevailing conditions of a network medium.

In the event of collisions in networks without RTS-CTS and/or ACK mechanisms for collision detection, there may be exposure to loss of synchronization with the grid. Contending nodes may continue to transmit while listening nodes may be unable to discern an expected duration for the ongoing transmission(s), thus rendering the current transmission grid unusable. In accordance with an alternative preferred embodiment of the present invention, such loss of synchronization may be prevented by expanding a wildcard slot 115 to a standard sized backoff window as soon as the beginning of a transmission is detected.

A node 60 wishing to transmit in a wildcard slot 115 may indicate an intention to use wildcard slot 115 by first transmitting an INUSE signal. Listening nodes 60 may then adjust their associated schedules 110 to indicate that the duration of that particular wildcard slot 115 may now be that of a standard backoff window. It will be appreciated that wildcard slot 115 may be expanded regardless of whether or not an actual collision is detected. A node 60 transmitting during any wildcard slot may always proceed as if a collision had indeed been detected; "backing off" a random duration of time within the backoff window before transmitting. If a collision does indeed occur, then the contending nodes 60 may resolve the contention within the backoff window without affecting the other listening nodes 60. If there is no collision, then the transmitting node 60 may complete its transmission unaffected. In either case, by expanding the wildcard slot 115 into a backoff window, the chances of colliding transmissions throwing off the synchronization within the network may be greatly reduced.

It will be appreciated that this method may increase the duration overhead for transmission during wildcard slots 115. However, the additional overhead may be incurred only when a transmission actually takes place. When slots 115 may be unused, no additional overhead may be incurred.

As per the prior art, an expected duration may be included in a transmission to enable listening nodes 60 to adjust schedule 100 accordingly. It will be appreciated that in the event of a collision during a wildcard slot 115, it may not be possible to for a listening node 60 to receive this expected duration, which may in turn lead to a loss of synchronization as the colliding transmission(s) may continue. Because there may be no way to know how long a colliding transmission may continue, listening node 60 may have to use physical carrier sensing until the collision subsides, and only then may it attempt to resynchronize with the network. In accordance with a preferred alternative embodiment of the present invention, the impact of collisions during wildcard slots 115 may be lessened by a priori limiting the length of transmissions that may be initiated during slots 115.

It will be appreciated that the specification of HPNA v3.1 may be exemplary. The present invention may be implemented in accordance with other standards such as 802.11, HPAV, and G.hn. It will be appreciated, however, that support for the present invention must be included the current specifications for a standard in order for such implementation to be successful.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
   receiving a schedule of transmission start slots on a network node, wherein said transmission start slots represent at least one of reserved and non reserved transmission initiation opportunities for the initiation of data transmission by at least one of a plurality of network devices in a network, said reserved opportunities being associated with specific said network devices, and said non reserved opportunities being available for non reserved use by any said network devices on said network;
   adjusting said schedule in accordance with successful transmissions by other network nodes;
   attempting to transmit in accordance with one of said transmission start slots representing said non reserved transmission opportunity;
   transmitting an "INUSE" signal;
   expanding said transmission start slot to a standard sized backoff window;
   backing off within said backoff window in accordance with a random duration;
   transmitting data; and
   resolving any ensuing detected collisions as necessary.

2. The method according to claim 1 and wherein said attempting comprises:
   detecting at least an unsuccessful attempt to transmit;
   backing off in accordance with a random number of said non scheduled transmission initiation opportunities as per said schedule; and
   reattempting to transmit in accordance with a another said transmission start slot representing a subsequent said non scheduled transmission opportunity as per said schedule.

3. The method according to claim 2 and wherein said detecting comprises:
   transmitting a request to transmit (RTS); and
   waiting a predefined period of time to receive a "clear to send" (CTS) in reply to said RTS.

4. The method according to claim 2 and wherein said detecting comprises:
   using physical collision detection based on echo cancellation.

5. The method according to claim 2 and wherein said detecting comprises waiting a predefined period of time to receive an "ACK", wherein said ACK indicates an acknowledgement that said data was received.

6. The method according to claim 1 and wherein said adjusting comprises:
   detecting transmissions by other said network nodes in accordance with said schedule; and
   delaying said transmission start slots in accordance with a transmission length of said detected transmissions.

7. The method according to claim 1 and wherein said network uses a powerline medium.

8. The method according to claim 1 and also comprising expanding said transmission start slot in accordance with an expected duration for said data transmission, wherein an indication of said duration is included in said data transmission.

9. The method according to claim 1 and wherein each said transmission start slot is expandable to a predefined limit.

* * * * *